United States Patent
Fischer et al.

(10) Patent No.: US 8,061,231 B2
(45) Date of Patent: Nov. 22, 2011

(54) TRANSMISSION SHIFT DEVICE WITH VARIABLE GATE BLOCKING FORCE

(75) Inventors: Dieter Fischer, Nonnenhorn (DE);
Klaus Spaeth, Berg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 857 days.

(21) Appl. No.: 12/089,940

(22) PCT Filed: Oct. 13, 2006

(86) PCT No.: PCT/EP2006/009905
§ 371 (c)(1),
(2), (4) Date: Apr. 11, 2008

(87) PCT Pub. No.: WO2007/048512
PCT Pub. Date: May 3, 2007

(65) Prior Publication Data
US 2008/0245174 A1    Oct. 9, 2008

(30) Foreign Application Priority Data
Oct. 27, 2005    (DE) .......................... 10 2005 051 377

(51) Int. Cl.
*B60K 20/00*    (2006.01)
*G05G 5/00*    (2006.01)
(52) U.S. Cl. .................................................. 74/473.21
(58) Field of Classification Search ............... 74/473.11, 74/473.21, 473.23, 473.24, 473.36
See application file for complete search history.

(56) References Cited

U.S. PATENT DOCUMENTS

| | | | | |
|---|---|---|---|---|
| 5,546,825 A | * | 8/1996 | Riley et al. ................. | 74/473.24 |
| 6,361,473 B1 | * | 3/2002 | Mason et al. ................. | 477/124 |
| 7,290,460 B2 | * | 11/2007 | Fischer ........................... | 74/335 |

FOREIGN PATENT DOCUMENTS

| | | |
|---|---|---|
| DE | 24 47 860 | 4/1976 |
| DE | 100 29 497 A1 | 1/2002 |
| DE | 100 29 527 A1 | 1/2002 |
| EP | 1 273 832 A1 | 1/2003 |
| WO | WO-85/00415 | 1/1985 |
| WO | WO-2005/073601 A1 | 8/2005 |

OTHER PUBLICATIONS

Machine Translation of DE 100 29 527 A1.*

* cited by examiner

*Primary Examiner* — Justin Krause
(74) *Attorney, Agent, or Firm* — Davis & Bujold, P.L.L.C.

(57) ABSTRACT

A transmission shift device for a transmission having a range group transmission and a shift lever with a superimposed H-shaped shift pattern in which a shift and selector shaft is operatively connected at one end with the shift lever and at the other end with a shift mechanism. A blocking device, which is actuated by, prevents or makes inadvertent transmission gear shifts in a range group detectable to the driver so that the shift and selector shaft is independently shiftable from a first shift gate to a shift gate of the next two lower gears. The transmission shift device prevents undesired incorrect gearshifts in a range group shift as well as making it possible to downshift across several gearsets by making the force of displacing the shift and selector shaft changeable over the regulated distance to the shift gear of the next lower gears.

9 Claims, 4 Drawing Sheets

TRANSMISSION SHIFT DEVICE WITH VARIABLE GATE BLOCKING FORCE

This application is a national stage completion of PCT/EP2006/009905 filed Oct. 13, 2006, which claims priority from German Application Serial No. 10 2005 051 377.8 filed Oct. 27, 2005.

FIELD OF THE INVENTION

The invention concerns a transmission shift device.

BACKGROUND OF THE INVENTION

Transmissions of large industrial vehicles are usually divided into a main transmission, a splitter group transmission and a range transmission. At the same time, these transmissions have a shifting device supported by pneumatic circuit conducts pneumatic gearshifts in the splitter group transmission and in the range transmission while, at the same time, the gearshifts in the main transmission are manually carried out by the driver being supported by the pneumatic circuit in the force to be exerted.

Electronic devices are used to a greater extent for control of motor vehicle transmissions used today. These arrangements serve, together with other ends, also prevent, in the transmission, gearshifts that are not admissible due to other conditions, in particular to high vehicle speeds calculated on the gear intended to be shifted.

Such a pneumatic shift device with mechanisms for protecting against incorrect actuation has become known from DE-OS 24 47 860. The described device has different elements dispersed throughout the whole transmission so that, between the individual pneumatic elements, complicated branching air pressure lines are needed and a multiplicity of electric lines of individual elements for the electronic control device have to be laid. The parts comprise a main shut-off valve for the pneumatics and a gate blocking cylinder.

The pneumatic switch of a group transmission is triggered by a pneumatic valve on the shift lever. In certain cases, the result of this is that the driver, despite an activated gate block, can select the incorrect gate since the pressure build up in the gate block cylinder occurs too slowly due to the line lengths.

Besides, German patent applications DE 100 29 497 A1 and DE 100 29 527 A1 have disclosed an electro-pneumatic shift unit for a vehicle transmission having a pneumatically shifted range group transmission whose gearshifts can be preselected manually on a shift lever by the driver. The shift unit comprises a blocking device for mechanically preventing the manual gearshift of inadmissible gear ratios of the vehicle transmission and a device for preventing the pneumatic gearshift of inadmissible gear ratios of the vehicle transmission. The blocking device for mechanically preventing the manual gearshift and the device for preventing the pneumatic gearshift are controlled by a common control device.

The shift unit is now designed so as to result in preventing an undesired direct change from the shift gate for the gears five and six of the gear group of high gears to the shift gate lying in the same location for the gears one and two of the gear group of lower gears. For the purpose, in a preselected change from the gear group for higher gears to the gear group for lower gears, the shift shaft is then automatically moved by the blocking device by way of a recoil force produced in the shift gate of the gears three and four when the transmission shift lever, after the range group change preselection, has been brought to its neutral position.

A ramp built in the shift shaft and axially extending there with constant axial gradient services, during interaction with a pin of the blocking device engaging there, for the purpose that in the operating situation described, the shift shaft is autonomously pushed with constant force to the gate for the third and fourth gears. The blocking device and particularly the ramp in the shift shaft are constructed and synchronized with each other so that the driver, when needed, can overpress the recoil force applied by the blocking device together with the ramp. Thereby a downshift is determined by need with gear group change, for example, from the fifth gear to the second gear.

Although the already known electro-pneumatic shift unit has a few advantages, it is of comparatively complex construction. Besides, the shift unit is associated with a technical problem that the blocking force with which the shift shaft is held in the gate for the third and fourth gears must be relatively great in order that the driver, via the increased control force to be applied by him in a shift lever actuation, is reliably signalized that a group change has taken place when an incorrect gearshift is to be prevented.

In a transmission shift device, between the shift lever and the connecting means of the transmission, since there are some parts to be moved, their bearing friction on other parts caused by motion, the same as the gate blocking force, take care in the extreme case that despite the control force of the driver on the shift lever, the gate blocking described cannot be overpressed.

Therefore, the instant invention is based on the problem of providing a shift device for a generic transmission which is of simple construction and reliably prevents incorrect gearshifts between ratio groups of the range group transmission by way of a blocking device, the same as makes possible an emergency downshift across the range group of the transmission from a very high gear to a very low gear.

SUMMARY OF THE INVENTION

Accordingly, the invention relates to a shift device for a range group transmission and a shift lever having a superimposed H-shaped shift pattern in which a shift and selector shaft is operatively connected at one end with the shift lever and at the other end with a transmission-side shift mechanism, such as shift rails and/or shift rockers. In addition, the transmission shift device has a blocking device which is actuatable by a pressure medium and prevents, or at least makes noticeable, the unintended activation of transmission gears in a range group change so that the shift and selector shaft in a range group change independently, i.e., without influence by the driver and is displaceable from one shift gate to the shift gate of the next two lower gears.

This transmission shift device is additionally constructed for preventing undesired incorrect gearshifts in a range group change, as well as for making it possible in an emergency to downshift across several gear steps so that the shift and selector shaft is displaceable from a shift gate with a force variable over the regulating distance to the shift gate of the next lower gears.

This transmission device is associated with several advantages. In the first place, it effectively prevents that, in case of a range group change in the transmission preselected by the driver, triggering inadvertent downshifts which undesiredly surpass several, in any case more than three, gear steps. This occurs by the fact that the shift and selector shaft, after the range group change preselected by the driver and after reaching the neutral position of the shift and selector lever without the driver's influence and controlled by the actuator, is led to the shift gate of the immediately next lower gears. The controlling force with which the shift and selector lever or the shift lever is pushed to the shift gate is initially great and decreases in direction to the last mentioned shift gate. Thereby the adjusting motion occurs at the start quicker than at the end whereby the danger area for an undesired gearshift is quickly abandoned.

On the other hand, in emergency situations, the driver still can effect a downshift across several gears, for example, from the sixth gear to the first gear, should he deem this convenient. To do so, he has to overcome only the adjusting force of the blocking device. At first, this is easy and increasingly becomes more difficult on account of the opposite set direction. Thereby the driver is unmistakably signaled that he will carry out an at least unusual downshift.

it is provided, according to a preferred embodiment of the invention, that the variable forces F1 to F2, automatically acting on the shift and selector shaft, consist of a static basic force $F_K$ produced by a piston-cylinder arrangement and which, changed by a lever system regarding its amount and its effective direction, is transmitted to the shift and selector shaft.

To produce the static basic force $F_K$, it is preferably provided that the piston-cylinder arrangement comprises one cylinder and one axially slideable locking piston located therein. The cylinder has also a bore for conducting gas as pressure means. The pressure chamber of the cylinder is loaded, via a bore, with the unmodulated main pressure of a related pressure means system which, during operation of the vehicle, is steady and unregulated.

In one other embodiment of the invention, the blocking piston has an adjusting bolt projecting out of the cylinder and a front side acting upon a stop pawl that is supported to rotate about a rotation point. The stop pawl serves for the deflection and variation according to magnitude of the static basic force produced by the piston-cylinder arrangement in the variable controlling force across the regulating distance of the shift and selector shaft.

To solve this problem, a lock pawl is provided that has a first lever arm and a second lever arm. The first lever arm is in contact with the shift and selector shaft and the second lever arm interacts with the front side of the adjusting bolt of the blocking piston.

To be able to implement a mechanically reliable contact between the lock pawl and the shift and selector shaft, it is preferably provided that the shift and selector shaft has in the contact area with the first lever arm of the lock pawl a shift collar on which the first lever arm axially engages.

Upon the shift and selector shaft, to produce the desired control force variable over the regulated distance, in addition, it is provided that the second lever arm has a special arm geometry on its side facing the blocking piston which, during axial displacement of the blocking piston or a deviation of the lock pawl, produces lever arm lengths of different effectiveness.

According to another alternative, this active principle is reversed so that the front side of the adjusting bolt has a geometry which, when interacting with the second lever arm of the lock pawl during an axial displacement of the blocking piston or a deviation of the lock pawl produces lever arm lengths of different effect.

The lever arm lengths of different effect modulate or change the static basic force $F_K$ produced by the piston-cylinder arrangement into a controlling force F1 to F2 changeable via the angle of avertence or the regulating distance of the shift and selector shaft. At the same time, at the beginning of the control movement there acts a relatively strong control force F1 which, in direction to the shift gate, to be autonomously moved along as desired, diminishes to a control force F2.

A specially compact construction of this transmission shift device provides that the shift and selector shaft be located in a housing; that the shift collar of the shift and selector shaft be built in the area of a chamber of the housing; that the lock pawl be tiltably located on the housing in the area of the chamber; that the control bolt of the blocking piston projects axially into the chamber, and that the cylinder be a component part of the housing or be fastened thereon.

BRIEF DESCRIPTION OF THE DRAWINGS

The invention will now be described, by way of example, with reference to the accompanying drawings in which.

DETAILED DESCRIPTION OF THE INVENTION

Figure 1:
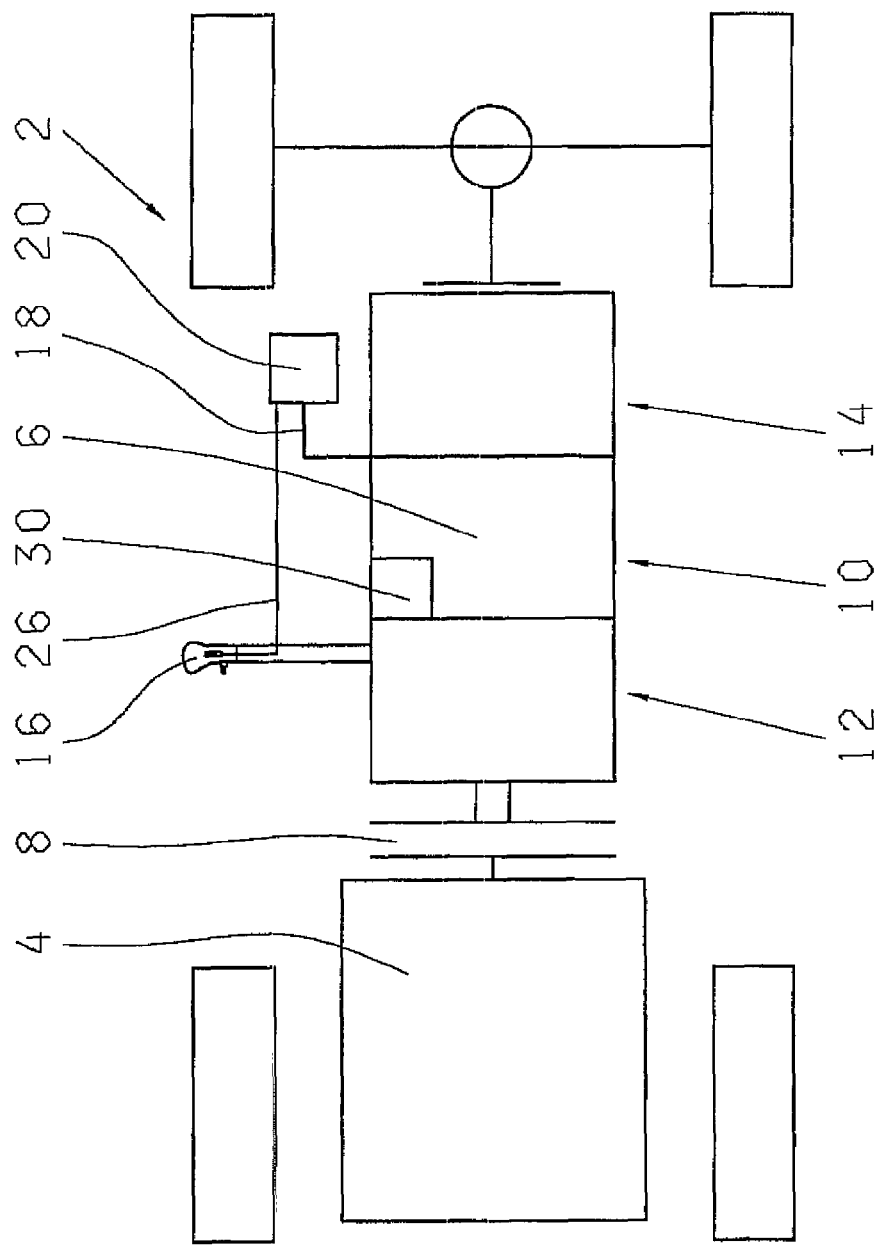
FIG. 1 is a diagrammatic representation of a drivetrain of an industrial vehicle.

Accordingly, FIG. 1 shows a motor vehicle 2 with a prime mover 4, a transmission 6 and a clutch 8 situated therebetween. The transmission 6 has a main transmission 10, a splitter group transmission 12 and a range group transmission 14. The main transmission 10 is manually shifted by the driver, via a shift lever 16. For this purpose, the shift lever 16 is operatively connected via a shift and selector shaft 32 and a transmission shift device 30 with a transmission-side gearshift mechanism (not shown). The transmission shift device 30 also comprises blocking means which prevents undesired gearshift operations and/or make them detectable to the driver at least during a shift lever side gearshift operation. The shift lever 16 can also be connected with the transmission shift device 30, via pneumatic lines (not shown). As a whole, the transmission 6 is connected with an electronic control device 20, via electric connecting lines 18, and the shift lever, via electric connecting lines 26.

Figure 2:
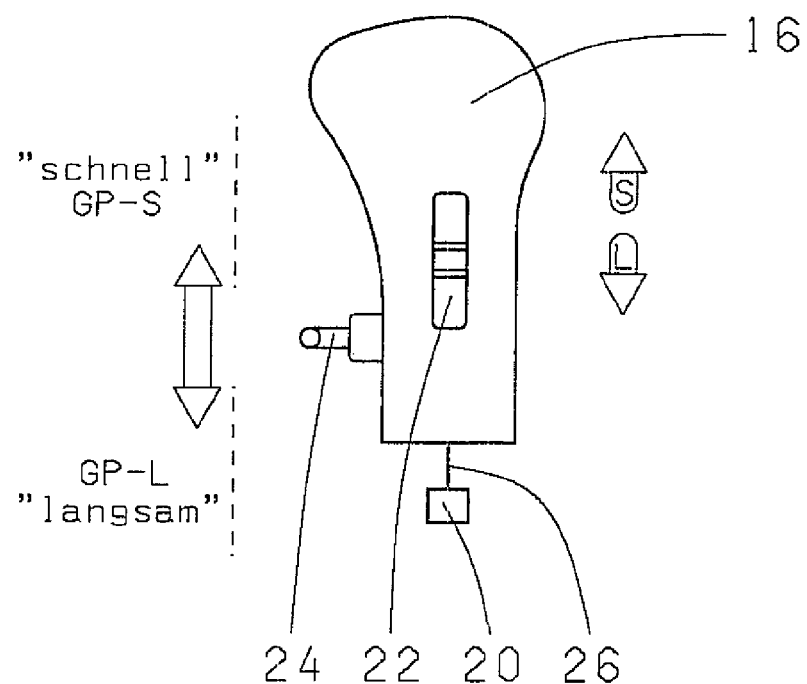
FIG. 2 is a shift lever of the transmission shift device, according to FIG. 1.
Figure 3:
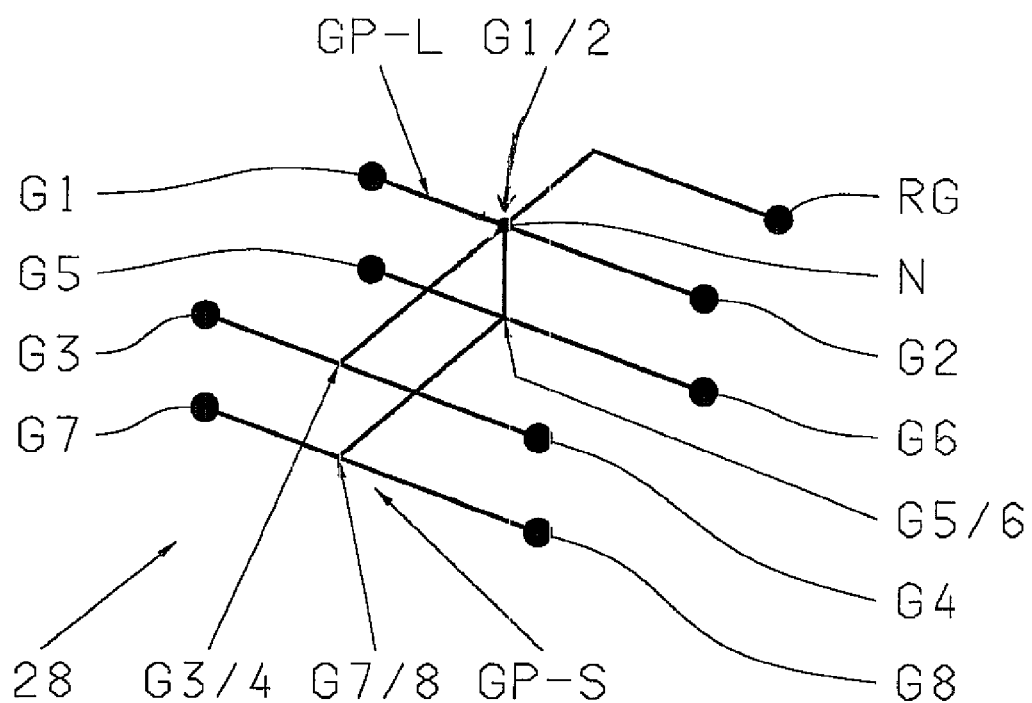
FIG. 3 is a shift diagram for the shift lever, according to FIG. 2.

FIG. 2 shows an enlarged representation of the shift 16 for the transmission 6, according to FIG. 1, which is actuatable in conformity with a shift pattern 28, according to FIG. 3. The shift pattern 28 is designated as a "superimposed H" since the terminal positions of the respective H-legs of two H-shift diagrams in an H-shift diagram GP-L the slow gear positions and in an H-shift diagram GP-S the quick gear positions of the shift lever are superimposed. Thereby the gearshift positions G1 and G5 for the first gear (the same as for the fifth gear); G2 and G6 for the second gear (the same as for the sixth gear); G3 and G7 for the third gear (the same as for the seventh gear), and G4 and G8 for the fourth gear and the eighth gear, respectively, on the same place of a shift lever deflection.

Laterally, a toggle switch 22 is located on the shift lever 16 for preselecting or for triggering the gearshift of the splitter group transmission 12. On the front side of the shift lever 16 is one other toggle switch 24 by way of which the range group transmission 14 is preselected or switched. Both toggle switches 22 and 24 are electric switches connected to the control device 20, via at least one electric connecting line 26.

In a gearshift of the shift lever 16, according to the shift pattern 28, as explained regarding the forward gears, two ratio steps are coordinated with each terminal position of the shift lever 16, which differ by the ratio jump of the range group transmission 14. In the "slow" position of the toggle switch 24, the shift positions G1 and G4 of the H-shift diagram GP-L, as well as the downshift gear RG can be obtained by the driver for manually disengagement and/or carrying out of shift operations. In the "quick" toggle switch position, these are the gears G5 to G8 of the H-shift diagram GP-S. In this embodiment, a neutral position N of the shift lever 16 is in the shift gate position G1/2 between the shift positions for gears G1 and G2.

The driver has to preselect a change between the two ratio or gear groups of the range group transmission 14 by way of the toggle switch 24 on the shift lever 16. The change is carried out as soon as the shift lever 16 is manually adjusted to the neutral position N and this is also accomplished in the main transmission 10.

The splitter group transmission 12 is preselected in position "L" or "S" with the toggle switch 22 on the side of the shift lever 16 and is shifted by actuating the clutch 8 (see the single arrow to the right, next to the shift lever 16).

As has already been said, the driver has to preselect the change of the range group transmission 14 by way of the toggle switch 24 on the shift lever 16. The change is then carried out as soon as it has been manually shifted to the neutral position N in the main transmission 10. Additional safeguarding steps must be found to prevent inadvertent gearshifts. A group blockage related to this therefore suppresses shifting of the range group transmission 14 to the slow ratio, thereby protecting both synchronization of the range group transmission 14 and synchronization of the main transmission 10.

Figure 4:
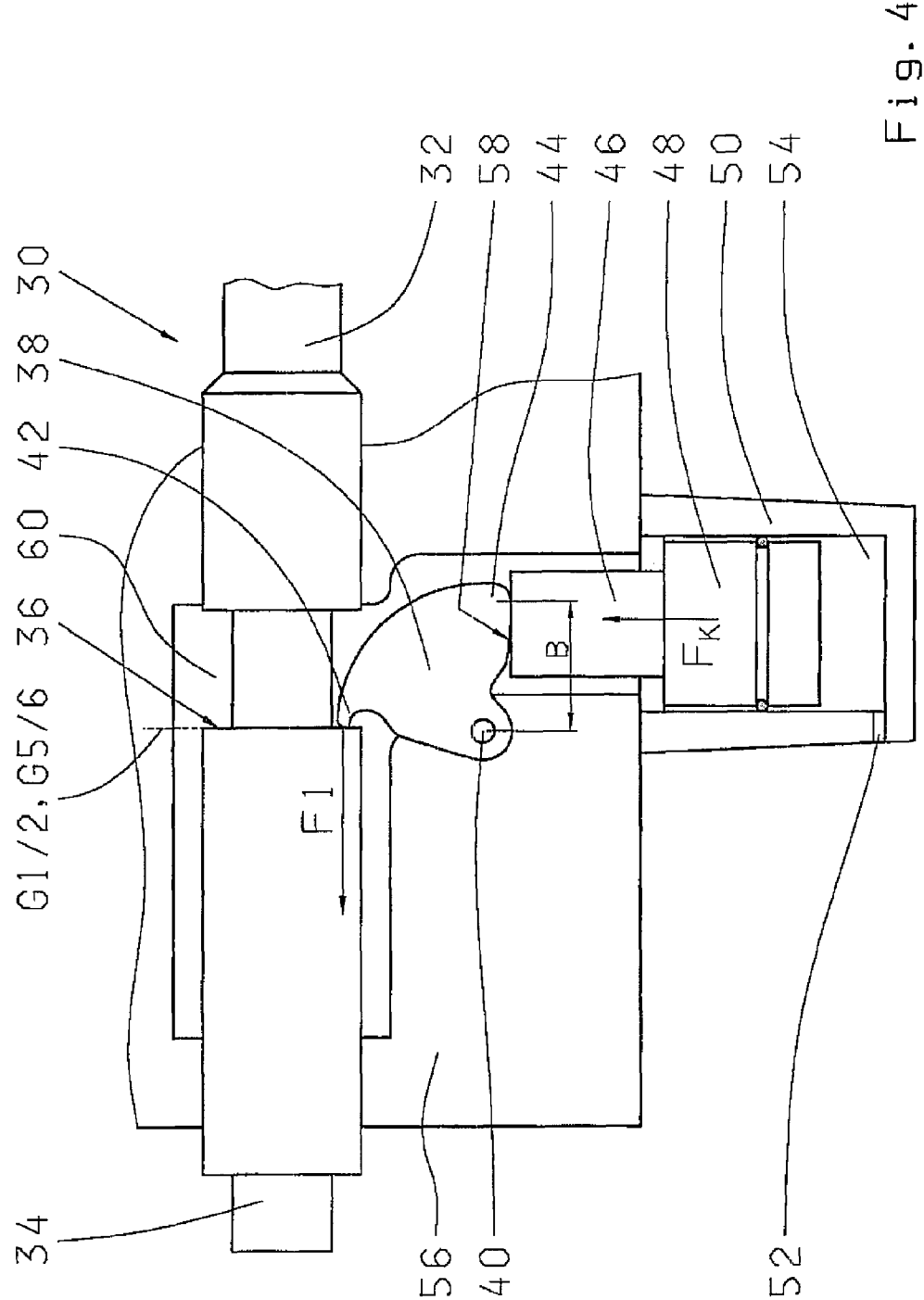
FIG. 4 is a diagrammatic cross-sectional view of an inventive transmission shift device with a blocking device in a first actuation position.

FIGS. 3 and 4 show the transmission shifting device 30 for the transmission 6 and the shift lever 16 with the superposed H-shift pattern 28 in diagrammatic sectional representations. The shift and selector shaft 32 are respectively to be detected which, in these representations, are connected at the left via an interface 34 with the transmission shift lever 16 and at their opposite end with the shift actuation on the transmission side.

The shift and selector shaft 32 is axially slidably supported in a housing 56 of the transmission shift device 20 which has a chamber 60. In the area of the chamber 60, the shift and selector shaft 32 has a radial shift collar 36 available which engages a lock pawl 38 tiltably supported around a rotation point 40 with a first lever arm 42. The lock pawl 30 has a second lever arm 44 contiguous to the first lever arm 42, which can be biased by an adjusting bolt 46 of a blocking piston 48 with a basic force $F_K$. The blocking piston 48 is axially slidably located in a cylinder 50 of a piston-cylinder arrangement whose pressure space 54 can be pressurized with pressure means via a bore 52 in the cylinder 50.

While the front side end of the adjusting bolt 46 of the blocking piston 48 is designed as a flat surface, the second lever arm 44 has a particular lever arm geometry 58 in the contact area with the adjusting bolt 46 which causes a lever arm length B, operative on the second lever arm 44, to change, depending on the axial position of the blocking piston 48 or on the rotation angle of the lock pawl 38 around the point of rotation 40. As a result of this constructional assembly, when the blocking piston 48 is actuated, the lock pawl 38, with its first lever arm 42, acts with controlling forces of a different magnitude F1 to F2 on the shift collar 36 of the shift and selector shaft 32.

The invention also comprises structural alternatives in which the front side of the adjusting bolt 46 and/or the lever arm geometry 58 of the second lever arm 44 are designed of different shapes, but likewise exert adjusting forces of different magnitudes on the shift and selector shaft 32, via the regulating distance. According to such an alternative given by way of example, both the second lever arm 44 and the front side of the adjusting bolt 46 have curved contact surfaces coordinated with each other.

Figure 5:
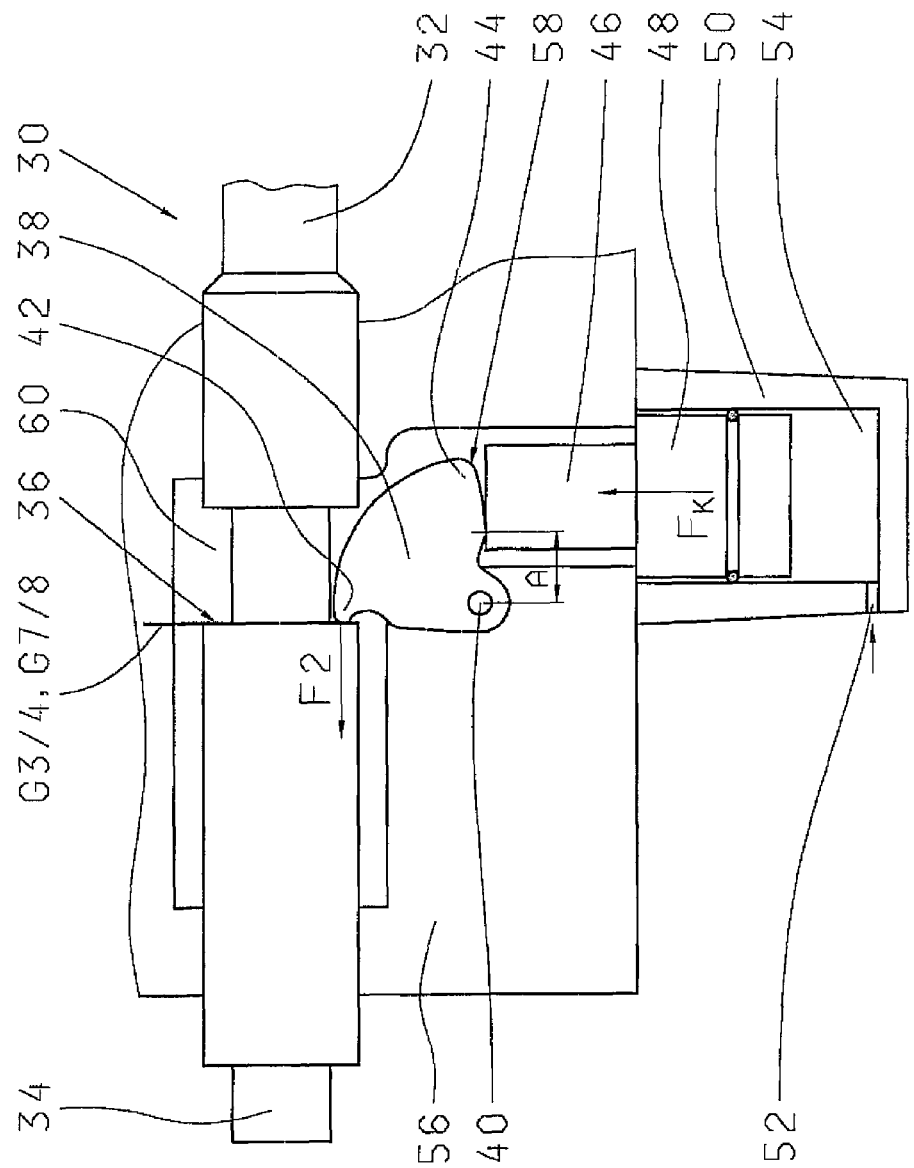
FIG. 5 is a transmission shift device, according to FIG. 3, in a second actuation position.

In the examples shown in FIGS. 4 and 5, the lever arm geometry 58 of the second lever arm 44 is now selected so that in a first piston position (FIG. 4) the force F1, acting upon the shift and selector shaft 32 in direction to the shift lever 16, is comparatively great due to the effective lever length B on the second lever arm 44 and in another axial displacement of the blocking piston 48 in the cylinder 50 in direction to the lock pawl 38 decreases to a force F2 to an effective lever arm length A (FIG. 5).

By a skillful geometric design of the lock pawl 38 or of the lever arm lengths and contact geometries thereof, under the basic force $F_K$, preset by the piston-cylinder arrangement 48, 50, the forces F1 to F2, acting on the shift and selector shaft 32, can be adjusted in broad scopes, as needed.

The manner of operation of this transmission shift device 30 is explained in detail herebelow.

In an initial situation, according to FIG. 4, the sixth gear G6 is activated in the transmission. The driver now intends a downshift to the third gear G3. Since the third gear G3 can only be obtained via a range group change, the driver first actuates the toggle switch 24 on the shift lever 16 for preselecting the range group change. As soon as the shift lever 16 is shifted by the driver toward the neutral position N, which is mechanically accomplished in the main transmission 10, the control device 20 produces, inside the transmission under actuator control, a range group change in the range group transmission 14 in which a first ratio step is disconnected and a second ratio step connected.

To prevent an undesired gear being activated, the pressure means in the pressure space 54 of the cylinder 50 acts in the gate blocking device upon the blocking piston 48 in a manner such that its adjusting bolt 46 presses upon the second lever arm 44 of the lock pawl 38 with a basic force $F_K$. On account of the lever length B, which is greatly operative in this position, to start an adjustment motion of the first lever arm 42 of the lock pawl 38 a relatively great shifting force F1 is pressed upon the shift and selector shaft 32.

From the shift position G1/2, which corresponds to the neutral position N in the shift gate for the first gear G1 and the second gear G2, the shift and selector shaft 32 is pressed with a force diminishing over the regulated distance into the selector gate up to the shift position G314. The shift position G3/4 corresponds to the neutral position of the shift gate for the gears G3 and G4. Here only a shift force F2 acts upon the shift and selector shaft 32 which, on account of the slight operative lever length A, is detectably less than the initial shift force F1.

If the driver now moves the shift lever 16 in the direction toward the position for the third gear G3, the third gear G3 is also activated. An unintended downshift to the first gear G1 is thereby reliably prevented.

So far as the driver really would wish to shift from the sixth gear G6 to the first gear G1, this is absolutely possible. For this purpose, he has to move the shift and selector lever 32 by a related shift lever deflection, from shift position G3/4 to shift position G1/2 for which he only has to overcome the relatively low shift force F2 at the start. On account of the non-linear arm geometry 58 of the second lever arm 44 of the lock pawl 38, this control force rises non-linearly over the regulated distance of the shift and selector shaft 32 so that this increase of force up to the value of the shift force F1 is clearly detected by the driver in the sense of a warning indication. As soon as the shift and selector shaft 32 has reached the shift position G1/2, shown in FIG. 4, the gear change the driver desires from the sixth gear G6 to the first gear G1 is possible.

Alternative to the electric connecting line 26 of the shift lever 16 and the electric toggle switch 22 with the control device 20, a pneumatic valve arrangement in the shift lever 16 can also be provided which, via a pneumatic line, is connected with the transmission shift device 30 corresponding to the arrangement of DE-OS 24 47 860 and can trigger gearshifts in the splitter group transmission 12 and range group transmission 14.

REFERENCE NUMERALS 2 motor vehicle
4 prime mover
6 transmission
8 clutch
10 main transmission
12 splitter group transmission
14 range group transmission
16 shift lever
18 connecting line
20 control device
22 toggle switch
24 toggle switch
26 connecting line
28 shift pattern
30 transmission shift device
32 shift and selector shaft
34 interface to shift lever
36 shift collar on the shift and selector shaft
38 lock pawl
40 rotation point of lock pawl
42 first lever arm
44 second lever arm
46 adjusting bolt
48 blocking piston
50 cylinder
52 bore in cylinder
54 pressure space
56 housing
58 lever arm geometry of lock pawl
60 chamber in housing 56
A operative lever length
B operative lever length
F1 force of lock pawl on shift and selector shaft, pos. G1/2
F2 force of lock pawl on shift and selector shaft, pos. G3/4
$F_K$ basic force
G1/2 shift position in the shift gate G1-G2
G314 shift position in the shift gate G3-G4
G5/6 shift position in the shift gate G5-G6
G718 shift position in the shift gate G7-G8
G1-G8 forward gears one to eight
GP-L H shift pattern for slow gear position
GP-S H shift pattern for quick gear positions
L shift position of the toggle switch 24
N neutral position
RG downshift gear
S shift position of the toggle switch 24

The invention claimed is:

1. A transmission shift device (30) for a transmission (6), the transmission shift device (30) comprising:
a range group transmission (14);
a shift lever (16) with a superimposed H-shaped shift pattern (28);
a shift and selector shaft (32) being operatively connected at a first end (34) to the shift lever (16) and, at a second end, to a shift mechanism;
a pressure actuated blocking device for one of detecting and preventing unintended activation of transmission gears during a range group change;
the shift and selector shaft (32), during the range group change, being independently displaced from a first shift gate (G5-G6) to a second shift gate (G3-G4) of a next two lower gears (G3, G4);
the shift and selector shaft (32) being displaceable from the first shift gate (G5-G6) with a force (F1 to F2) which changes, via a regulated distance, to the second shift gate (G3-G4) of the next two lower gears (G3, G4); and
the changeable force (F1 to F2) upon the shift and selector shaft (32) comprises a static basic force ($F_K$), produced by a piston-cylinder arrangement (48, 50) and changed by a lever system with regard to a magnitude and an operative direction, is transmitted to the shift and selector shaft (32).

2. The transmission shift device (30) according to claim 1, wherein the piston-cylinder arrangement comprises a cylinder (50) and a blocking piston (48), which is axially movably supported therein, the cylinder (50) has a bore (52) for conducting pressure and a pressure chamber (54) of the cylinder (60) is loaded, via the bore (52), with an unmodulated main pressure of a pressure means system.

3. The transmission shift device (30) according to claim 2, wherein the blocking piston (48) has an adjusting bolt (46) which projects from the cylinder (50) and has front side that acts upon a lock pawl (38) that is pivotably mounted about a point of rotation (40).

4. The transmission shift device (30) according to claim 3, wherein the lock pawl (38) has a first lever arm (42) and a second lever arm (44), the first lever arm (42) contacts the shift and selector lever (32) and the second lever arm (44) interacts with the front side of the adjusting bolt (46) of the blocking piston (48).

5. The transmission shift device (30) according to claim 4, wherein the shift and selector shaft (32), in a zone of contact with the first lever arm (42) of the lock pawl (38), has a shift collar (36) on which the first lever arm (42) axially engages.

6. The transmission shift device (30) according to claim 4, wherein the second lever arm (44) has on a side facing the adjusting bolt (46) a lever arm geometry (58) which, during one of axial displacement of the blocking piston (48) and pivoting of the lock pawl (38), produces lever arm lengths (A and B) that convey different values of force (F1 and F2).

7. The transmission shift device (30) according to claim 4, wherein a front side of the adjusting bolt (46) has a geometry which during interaction with the second lever arm (44) of the lock pawl (38), in one of axial displacement of the blocking piston (48) and pivoting of the lock pawl (38), produces lever arm lengths (A and B) that convey different values of force (F1 and F2).

8. The transmission shift device (30) according to claim 1, wherein the shift and selector shaft (32) is supported in a chamber (60) of a housing (56) and has a shift collar (36), a lock pawl (38) is supported in the chamber (60) of the housing (56), and an adjusting bolt (46) of a blocking piston (48) projects into the chamber (60) and a cylinder (50) is one of part of the housing (56) and fixed thereto.

9. A transmission shifting device (30) for a transmission (6) having a range group transmission (14) and a gearshift lever (16), and the shifting device (30) comprising:
a shift and selector shaft (32) having a first end being coupled to the gearshift lever (16) and a second end communicating with one of a shift rail and a shift rocker such that the gearshift lever (16) being shiftable within a superimposed H-shaped shift pattern (28) to shift between a plurality of transmission gears;

a locking pawl (38) being supported to pivot about a point of rotation (40) and having a first lever arm (42) and a second lever arm (44), the first lever arm (42) communicating with a collar (36), which is fixed to the shift and selector shaft (32), such that as the locking pawl (38) pivots the first lever arm (42) applies an axial force (F1, F2) on the shift and selector shaft (32);

a piston (48) being located within a cylinder (50) and communicating with the second lever arm (44) of the locking pawl (38) such that, as the cylinder (50) is pressurized, the piston (48) is biased causing the locking pawl (38) to pivot and apply the axial force (F1, F2) on the shift and selector shaft (32);

the second lever arm (44) of the locking pawl (38) having a geometry such that a distance between the point of rotation (40) of the locking pawl (38) and a point of contact between the piston (48) and the second lever arm (44) of the locking pawl (38) changes as the piston (48) is biased within the cylinder (50); and the change in distance between the point of rotation (40) of the locking pawl (38) and the point of contact between the piston (48) and the second lever arm (44) of the locking pawl (38) changes the axial force (F1, F2) applied on the shift and selector shaft (32) by the first lever arm (42) of the locking pawl (38) such that a range group change, from a first shift gate (G5-G6) to a second shift gate (G3-G4) of two lower gears (G3, G4), is detectable.

\* \* \* \* \*